UNITED STATES PATENT OFFICE.

WILLIS R. WHITNEY, OF ALPLAUS, NEW YORK, ASSIGNOR TO GENERAL ELECTRIC COMPANY, A CORPORATION OF NEW YORK.

PURIFICATION OF POROUS MATERIAL.

No. 923,745.      Specification of Letters Patent.      Patented June 1, 1909.

Original application filed January 17, 1906, Serial No. 296,570. Divided and this application filed January 30, 1909. Serial No. 475,275.

*To all whom it may concern:*

Be it known that I, WILLIS R. WHITNEY, a citizen of the United States, residing at Alplaus, county of Schenectady, town of Glenville, and State of New York, have invented certain new and useful Improvements in Purification of Porous Materials, (division of my application Serial No. 296,570, filed January 17, 1906,) of which the following is a specification.

My present invention relates to a process of removing impurities such as salts and their solutions from porous material, by subjecting the material to the influence of an electric current while suspended in a suitable solvent. In addition to this electrical treatment I use as the solvent, one which is substantially isotonic with respect to the salt or other impurity to be removed but which is itself inert and harmless with respect to the porous material to be purified.

My invention is readily applicable to the purification of any porous material containing a salt or compound which will go into solution, but as showing a specific embodiment of my improved process I have hereinafter described it as applied to the manufacture of the insulating compound commonly known in the electrical arts as "fiber." This material is somewhat similar to hard rubber in its electrical and mechanical properties, and is used for a great variety of purposes in the electrical arts.

In the manufacture of "fiber" it is customary to treat sheets of cellulose by passing them through a strong solution of chlorid of zinc, after which the sheets are piled one on another and compressed into a homogeneous mass. The zinc chlorid is then removed by washing. This washing is usually performed in several distinct steps by suspending the porous mass in different zinc chlorid solutions of diminishing concentration until pure water is reached, for it has been found that if the material is placed directly in pure water the osmotic pressure of the salt in the pores of the mass will draw in an excess of water and form water blisters. These blisters cause splits in the final product and are the cause of great losses in material even when extreme care is taken to prevent their formation by gradual, rather than by rapid washing. The thicker the sheet to be produced, the greater the difficulty due to osmotic pressure, and consequently, the greater the time and care necessary to remove the zinc chlorid, the complete removal of which is imperative. On this account, six weeks of washing by gradual treatment with more and more dilute solutions of the chlorid is necessary for sheets of an inch or more in thickness, thus greatly increasing the cost of material when made in thick masses.

The osmotic pressure of a solution depends on its concentration. The rate of diffusion of a salt from a concentrated solution to a dilute solution depends on the concentration differences of the two solutions with respect to that particular salt alone, and not with respect to other soluble substances which may be carried in one or the other solvents. These factors I make use of in my improved process by utilizing, as a solvent for the zinc chlorid, a solution which is isotonic with respect to the zinc chlorid solution to be removed. By isotonic I mean a solution having such a concentration that it will have the same osmotic pressure as the zinc chlorid solution to be removed. Thus, for example, a solution of glycerin or glucose in water may be used to wash the fiber mass and thereby remove the zinc chlorid previously employed in the chemical preparation of the mass. In this way the concentration of zinc chlorid in the wash water is kept low and consequently its rate of diffusion from the mass into the wash water is very high. The osmotic pressure of the washing solution being high, and of any desired predetermined value, does not allow the formation of water blisters in the fiber. The solution of glycerin or glucose in water used as wash water is not in any way detrimental to the product. Although, I have described this phase of my process as applied to the manufacture of "fiber" it will be understood that it is not limited to such use, but is applicable to a great variety of work and involves broadly the use of solutions of harmless material to drive out an approximately isotonic solution from the interstices of porous material.

As heretofore stated, I contemplate the use of an electric current to increase the velocity of motion of the ions of the salt or impurity, such as the zinc and chlorin ions composing the zinc chlorid within the porous material. The apparatus for carrying out this feature of my improved process may be very simple consisting principally of a source of current and suitable electrodes placed in the glucose or other washing liquid, and so arranged that the fiber in a sheet, or in any convenient form, can be passed through the washing liquid between the electrodes. The current causes the motion of zinc to the cathode and of chlorin to the anode and these two elements are thus separated at the electrodes. By a suitable addition of alkali and acid in dilute form to neutralize the products liberated at the electrodes and to preserve the isotonic condition of the washing liquid the process practically amounts to the replacement of the zinc and chlorin within the fiber by the components of water which form an electrochemical point of view are H and OH ions.

What I claim as new and desire to secure by Letters Patent of the United States, is:

1. The process of removing an ionized impurity from a porous material, which consists in subjecting said impurity to the electrolyzing action of an electric current, and carrying off the impurity in a solvent.

2. The process of removing an inorganic salt from a porous mass of cellulose, which consists in suspending said cellulose in a suitable solvent and passing an electric current through said solvent.

3. The process of removing zinc chlorid from cellulose, which consists in washing said cellulose, and simultaneously passing a current through said solution to accelerate the removal of said zinc chlorid.

In witness whereof, I have hereunto set my hand this 27th day of January, 1909.

WILLIS R. WHITNEY.

Witnesses:
BENJAMIN B. HULL,
HELEN ORFORD.